April 9, 1957  W. K. DOW  2,787,918
ACCELERATOR CONTROLLING DEVICE
Filed June 3, 1955  2 Sheets-Sheet 1
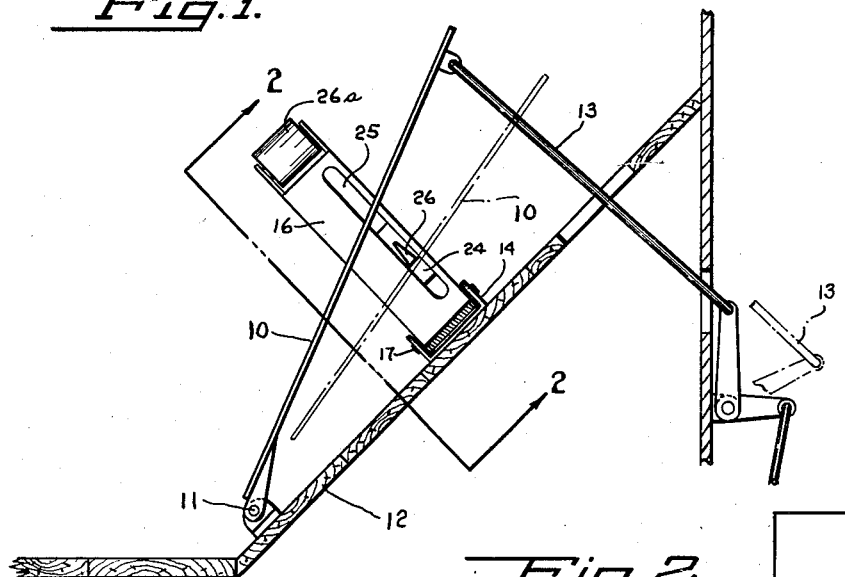
Fig. 1.
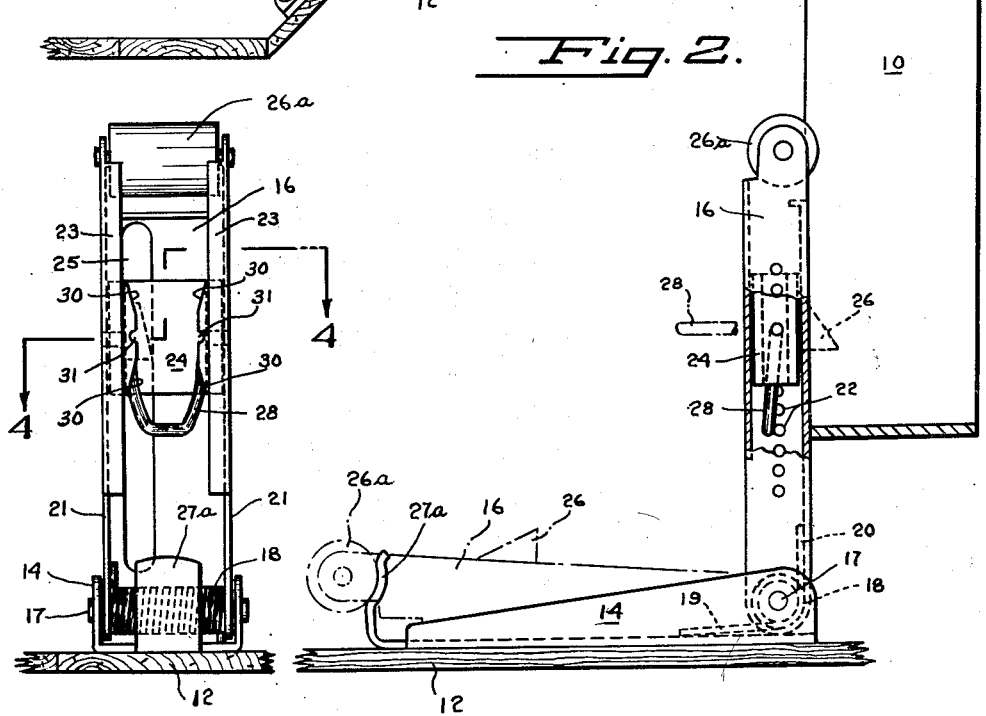
Fig. 2.
Fig. 3.
INVENTOR.
WALTER K. DOW
BY
Raymond A. Paquin
ATTORNEY.

April 9, 1957        W. K. DOW        2,787,918
ACCELERATOR CONTROLLING DEVICE
Filed June 3, 1955        2 Sheets-Sheet 2
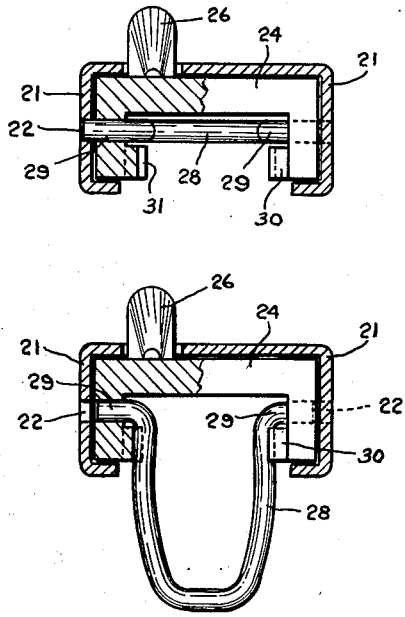
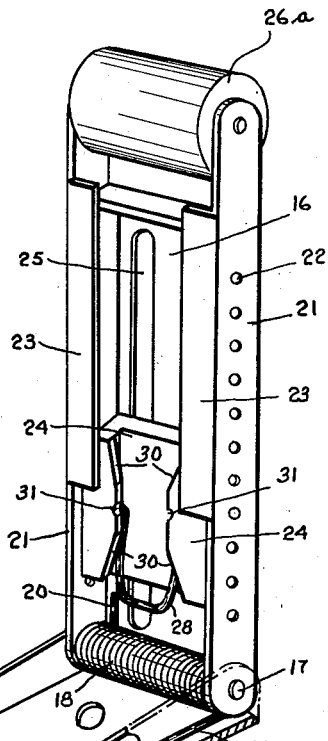
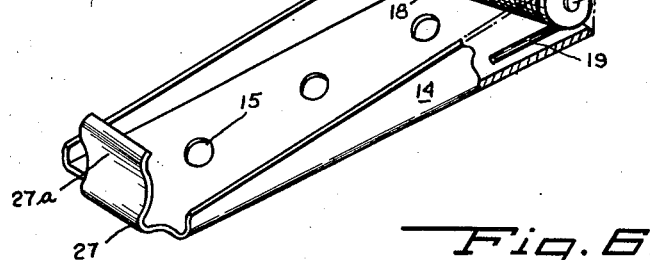
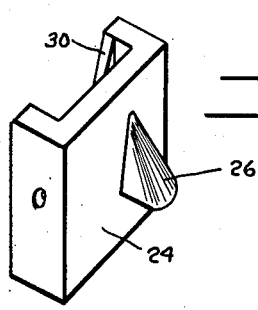
INVENTOR.
WALTER K. DOW
BY
*Raymond A. Paquin*
ATTORNEY.

United States Patent Office 2,787,918
Patented Apr. 9, 1957

2,787,918

ACCELERATOR CONTROLLING DEVICE

Walter K. Dow, Longmeadow, Mass.

Application June 3, 1955, Serial No. 513,122

10 Claims. (Cl. 74—532)

This invention relates to a new and improved device for retaining the accelerator of a vehicle in predetermined position and thereby providing the vehicle with a fixed cruising speed without the necessity of the operator retaining his foot pressure on the accelerator.

An object of the invention is to provide a device which is relatively simple in construction and which will position the accelerator of a vehicle in a fixed operating position of predetermined speed for controlling the cruising speed of the vehicle without the necessity of the normal foot pressure of the operator and which can be easily and quickly positioned in and out of operative position.

Another object is to provide a device of the type set forth for positioning the accelerator of a vehicle in a fixed operating position of predetermined speed setting that will be inoperative when the operator's foot is in its normal operating drive position.

Another object is to provide a device of the type set forth that can be quickly and readily adjusted out of operating position and retained in operative position until such time as the driver decides to again use the device when it can be easily and quickly adjusted into operative position.

Another object of the invention is to provide a device of the type set forth that is relatively simple and can be employed in existing vehicles and which can be easily and quickly adjusted to a wide range of positions for retaining the accelerator of the vehicle in a predetermined operating position.

Another object of the invention is to provide a device of the type set forth that can be easily installed in any vehicles by bolting or otherwise securing it to the floor of the vehicle adjacent the accelerator.

A further object of the invention is to provide a device of the type set forth which is relatively simple in design and yet efficient in operation for positioning and retaining the accelerator of the vehicle in a predetermined yet adjustable operating position and thereby eliminating the necessity of the operator's foot to be constantly on the accelerator during the operation of the vehicle on the open road.

Another object of the invention is to provide an accessory of simple design for retaining the accelerator of the vehicle in a predetermined operating position and which can be secured to the floor of the vehicle adjacent the accelerator and which will in no way interfere with the normal operation of the vehicle and yet can be so positioned that with a slight movement of operator's foot, the device can be made operative to hold the accelerator in its predetermined operating position to provide a set cruising speed for the vehicle without the necessity of the operator retaining his foot on the accelerator.

Another object of the invention is to provide a device of the type set forth having a hook means for holding the accelerator of the vehicle in a predetermined position with the hook means so positioned that normal foot position on the accelerator renders the hook inoperable by placing it out of position as regards the accelerator and in such a position that it will not catch on the operator's shoe.

Another object of the invention is to provide a device of the type set forth having a roller at the top of the hook slide arm so that a direct downward movement of the foot will readily deflect and disengage the hook means for the accelerator.

Other objects and advantages of the invention will be apparent from the following description taken in connection with the accompanying drawings. It will be understood that changes may be made in the details of construction and arrangement of parts without departing from the scope of the invention as set forth in the claims, as the preferred form of the invention has been given by way of illustration only.

Referring to the drawings:

Fig. 1 is a side view showing the device of the present invention in operative position relative to a vehicle accelerator;

Fig. 2 is a view taken on line 2—2 of Fig. 1, looking in the direction of the arrows;

Fig. 3 is a side view thereof taken from the side opposite that shown in Fig. 1;

Fig. 4 is a sectional view taken on line 4—4 of Fig. 3;

Fig. 5 is a view similar to Fig. 4 but illustrating the adjustment of the device;

Fig. 6 is a perspective view of the form of the invention shown in Figs. 1 through 5; and Fig. 7 is a perspective view of the hook means.

Referring more particularly to the drawings wherein similar reference characters designate corresponding parts throughout, the device shown is adapted for use in connection with a vehicle accelerator 10 which is pivotally mounted at 11 on the floor 12 of the vehicle and is adapted through rod 13, to control the quantity of fuel supplied to the vehicle engine to thereby control the speed of the vehicle.

During the operation of the vehicle on the open road over long periods of time, the operator's foot and leg, which must be maintained in a set position for such long periods of time, often becomes tired thereby causing discomfort to the operator. In order to overcome the necessity of the operator retaining his foot in set position on the accelerator for such long periods of time, I have provided a device which will retain the accelerator in predetermined position and which is adjustable whereby the operating speed or set cruising speed of the vehicle may be predetermined.

The apparatus of the present invention comprises a base 14 which is adapted to be secured to the floor 12 of the vehicle by means of bolts or other securing means through the openings 15. The arm 16 is pivotally mounted relative to base or support 14 by the pivot or hinge 17 which is spring loaded by the spring 18 which is wound on pivot 17 and has its opposite ends 19 and 20 engaging base 14 and arm 16 relatively and tending to urge said arm 16 away from said base and towards said accelerator 10 as hereinafter described.

The arm 16 is provided with the oppositely disposed flanges 21, each of which is provided a series of oppositely disposed openings 22. The flanges 21 are also each provided with the inturn lip 23 for retaining the adjustable member 24 in position between flanges 21 while allowing adjustment thereof.

Arm 16 is provided with a slot 25 through which extends hook or engaging member 26 of adjustable member 24. The top of the hook, as shown, is angled downwardly and will act as a cam slide if the foot comes into contact with the hook in pressing the accelerator. In addition to this, it is so placed at the forward side of the arm that the normal position of the foot while driving will not contact it due to the width of the arm.

Thus, as shown in Figs. 1, 3 and 6, the slot 25 having the hook 26 is provided off center on arm 16 in such direction that it will be at the forward side of the arm when the device is mounted on the vehicle adjacent the accelerator. The arm 16 is of sufficient width as to have the member 24 mounted for adjustment relative thereto and which is readily adjustable for holding the accelerator in the position necessary for any desired cruising speed.

The arm 16, is previously described, is pivotally connected to base 14 to form a simple hinge type, spring loaded device for fastening to the floor of the vehicle adjacent to the accelerator with the hinged arm 16 of sufficient length to protrude or extend above the accelerator 10 and this arm 16 is provided with a roller 26 pivotally connected to arm 16 at its upper end. Arm 16 is so positioned that the side of the operator's foot will cause engagement of it when the foot is in normal operating position, and the arm 16 is in upright position as shown in the drawings and the slight spring pressure in the hinge will always maintain the hinge arm 16 against the accelerator or the operator's foot when his foot is in normal driving position. Also, the hinged arm 16 of the device is so designed that in the event the operator does not want to use the device, as for city driving or in congested areas, the arm 16 can be closed by pivoting it against the base 14 and the roller 16 will engage the lock member 27 and retain the arm 16 in the position shown in broken lines in Fig. 2 and thus retain the device out of operating position. It is pointed out that the locking portion 27a of the locking device 27 is spaced upwardly from the base 14 as shown in Fig. 2 and thus allows the operator to place the side of his shoe beneath the roller 26 for moving the arm 16 to operative position.

The adjustable member 24 is adapted to be locked in adjusted position to provide a predetermined or desired cruising speed of the vehicle by means of the lock spring 28 which has its opposite ends 29 in openings in the sides of adjustable member 24 and adapted to extend through the openings 22 in the flanges 21 for locking the adjustable member 24 in adjusted position. The adjustable member 24 is provided with the oppositely disposed cam surfaces 30 for retracting the ends 29 of the spring member 28 from the openings 22 when the end of the spring is pivoted to the position shown in Fig. 5 and the adjustable member 24 may then be moved up or down to desired position and during such adjustment the ends 29 of the spring are retained out of operative position due to the slots or grooves 31 which retain the ends of the spring in neutral position and when the adjustable member 24 has been moved to adjusted height, the pivoting of the spring 28 out of such neutral position, either upwardly or downwardly will allow the ends 29 of the spring to protrude through the openings 22 in the flanges 21 for locking the adjustable member in desired relation and the force of the spring will retain such locking spring in adjusted position and thereby retain the adjustable member in such desired position.

When the device is not to be employed, as in city driving or in congested areas, the device can be pivoted out of operative position to that shown in broken lines in Fig. 2, as previously described.

When it is desired to employ the device, the operator places the side of his foot under the roller 26 and releases the arm 16 from the lock or catch 27a and the force of the spring 18 will then urge the arm 16 to a position where it engages the side of the accelerator pedal 10. When the accelerator pedal has been depressed to a position beneath the position of the hook or retaining member 26, the accelerator pedal, in depressing to this position, will ride over the upper cam surface of the hook 26 and push the arm 16 out of the way and then the force of the spring hinge will cause hook 26 to engage the upper surface of the accelerator pedal 10 to retain it in fixed predetermined position for providing desired cruising speed for the vehicle.

Should the operator desire to override the act of the device by placing his foot on the accelerator pedal, the side of the foot will engage the side of the arm 16 and urge the device out of operative position during such time as the operator has his foot on the accelerator pedal and then by depressing the accelerator pedal to the position beneath the hook 26 the device is placed in operative position.

When the device is in use on the open road, the foot bearing on the accelerator will also push the hinge far enough away from the accelerator so that the hook will not engage the accelerator and the accelerator can be pushed downwardly or released at will without interference of the device and the edge of the sole or shoe will ride up or down on the arm 16 without any difficulty and thus the vehicle will be controlled in the normal manner.

If the operator wishes to remove his foot from the accelerator, he merely presses the accelerator downwardly beyond the predetermined setting of the hook member 26, slides his foot sideways away from the arm 16 and the accelerator pedal is retained at the setting for desired vehicle speed. By swinging his foot back into normal operating position, the device is disengaged and the vehicle is operated in the normal manner.

On approaching a congested area or at the driver's decision to cease use of the device, a slight movement of the foot will snap the device to the floor out of operating position and likewise a slight movement of the foot can release it to useful or operative position when the operator wishes to use it.

From the foregoing it will be seen that I have provided new and improved means for obtaining all of the objects and advantages of the invention.

I claim:

1. In a device of the character described, a base adapted to be secured to the floor of a vehicle or the like, an arm pivotally connected to said base, an adjustable member carried by said arm, means carried by said arm for locking said adjustable member in adjusted position on said arm and catch means carried by said adjustable member adapted to engage the accelerator pedal for retaining it in predetermined adjusted position, and lock means on said base for locking said arm in inoperative position.

2. In a device of the character described, a base adapted to be secured to the floor of a vehicle or the like, an arm pivotally connected to said base, an adjustable member carried by said arm, means carried by said arm for locking said adjustable member in adjusted position on said arm and catch means carried by said adjustable member adapted to engage the accelerator pedal for retaining it in predetermined adjusted position, said catch means having an angular upper surface adapted to act as a cam slide if engaged by the foot during the pressing of the accelerator and lock means on said base for locking said arm in inoperative position.

3. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position and resilient means normally urging said arm to engagement with the side of said accelerator pedal.

4. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position and a spring hinge connecting said arm to said base and normally urging said arm into engagement with the side of the accelerator pedal.

5. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position, said slot and hook member being positioned forwardly of the center of said arm.

6. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position and resilient means normally urging said arm to engagement with the side of said accelerator pedal, said slot and hook member being positioned forwardly of the center of said arm.

7. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position, said slot and hook member being positioned forwardly of the center of said arm and lock means on said base for locking said arm in inoperative position.

8. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position, said adjustable member having oppositely disposed openings adapted to be aligned with openings in said arms and a spring member having its opposite ends adapted to extend into said aligned openings for locking said adjustable member in desired position.

9. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position, said adjustable member having oppositely disposed openings adapted to be aligned with openings in said arms and a spring member having its opposite ends adapted to extend into said aligned openings for locking said adjustable member in desired position said adjustable member having cam surfaces for retracting said oppositely disposed ends of said spring member upon pivotal movement of said spring member to allow adjustment thereof.

10. In a device of the character described, a base adapted to be secured to the floor of a vehicle or the like, an arm pivotally connected to said base and having a slot therein and an adjustable member in said arm and having a catch member protruding through said slot adapted to engage an accelerator pedal for retaining said accelerator pedal in desired adjusted position, a roller adjacent the free end of said arm and lock means on said base adapted to engage said roller for locking said arm out of operative position.

References Cited in the file of this patent
UNITED STATES PATENTS

| | | |
|---|---|---|
| 1,572,774 | Croxford | Feb. 9, 1926 |
| 1,704,505 | Kampman | Mar. 5, 1929 |
| 2,312,031 | Concher | Feb. 23, 1943 |
| 2,498,246 | Buckel | Feb. 21, 1950 |
| 2,507,807 | Newbern | May 16, 1950 |
| 2,586,111 | St. Maurice et al. | Feb. 19, 1952 |